3,322,491
METHOD OF TREATING EXHAUST GASES
Wayne T. Barrett, Severna Park, Leonard V. Triggiani, Hyattsville, and John S. Magee, Baltimore, Md., assignors to W. R. Grace & Co., New York, N.Y., a corporation of Connecticut
No Drawing. Filed July 31, 1963, Ser. No. 299,063
1 Claim. (Cl. 23—2)

This invention relates to an exhaust catalytic system for internal combustion engines. In one specific aspect, it relates to a catalytic system suitable for conversion of carbon monoxide and hydrocarbons to innocuous entities.

Air pollution is a growing probem in urban areas. It is known that the major portion of the organic pollutants in the air is derived from unburned or partially burned gasoline in auto exhaust. Carbon monoxide, another pollutant of much concern is also mainly derived from exhaust emissions.

It has been realized that the most practical way to treat exhaust fumes to reduce hydrocarbon pollution is to oxidize the hydrocarbons to carbon dioxide and water and to oxidize the carbon monoxide to carbon dioxide.

A wide selection of oxidation catalysts has been produced in the past varying both in chemical composition and physical structure. With respect to chemical composition, the ability of a great variety of metals and metal oxides either alone or in combination to catalyze the complete oxidation of hydrocarbons has been noted. Generally, however, the catalysts which are effective for hydrocarbon oxidation are not sufficiently effective for carbon monoxide oxidation or vice versa. The objective, then, is to prepare a catalyst that is satisfactory to bring about complete oxidation of both of these polluting components of exhaust gas.

We have found that a catalyst with good activity for both hydrocarbon and carbon monoxide conversion can be prepared by impregnating an alumina base with about 7 to 10% cerium oxide. The activity can be improved by the addition of a promotional amount (i.e., up to 10%) of cobalt oxide if desired.

The base found to be most suitable for our catalyst is a gamma-type alumina which is commercially available in the form of nodules. These nodules have a very desirable combination of properties. Their crushing strength is quite high, they are porous, have a high surface area and are easily packed into the catalyst reactors.

The catalyst is prepared by impregnating the base with an aqueous solution of a cerium salt, drying and finally calcining the material.

The cerium salt solution is prepared to contain a sufficient quantity of a cerium salt to deposit about 7 to 10 weight percent cerium oxide on the final catalyst. Suitable cerium salts include, for example, ammonium cerium nitrate, cerium nitrate, and cerium acetate.

After impregnation, the catalyst is separated from excess solution, then dried for about 18–30 hours at about 110° C. and finally calcined for about 4 to 8 hours at about 1000 to 1400° F.

If the catalyst is to be promoted with cobalt, the calcined ceria-alumina material is treated with ammonia and then with a sufficient amount of a cobalt nitrate solution to deposit up to 10% cobalt on the final catalyst. The catalyst is dried at 110° C. for about 4 to 8 hours and finally calcined for 14 to 20 hours at 1000 to 1400° F.

The activity of the catalyst is tested by determining the percent conversion of hydrocarbons and carbon monoxide as a function of average catalyst temperature. The conversion is determined by passing a mixture of gases maintained at predetermined temperatures over a 70 ml. volume of catalyst spread over a length of 5 inches. Total flow of the gases over the catalyst is 8.15 liters per minute. The mixture of gases used for the test contains 4.3% carbon monoxide, 4.7% oxygen, 1% water and 90% nitrogen along with 5000 parts per million of normal hexane.

Our invention will be further explained by the following examples.

EXAMPLE I

The impregnating solution was prepared by dissolving 255 grams of ammonium cerium nitrate $(NH_4)_2[Ce(NO_3)_6]$ in 400 ml. of deionized water. This is equivalent to 80 grams of $CeO_2$. The solution was filtered through a fine sintered glass funnel before use.

The solution was used to impregnate 400 grams of commercially available gamma-type alumina nodules. The mixture was allowed to stand for 16 hours. The base was then separated from excess solution, dried at 110° C. for 24 hours and finally calcined for 6 hours at 1000° F.

The catalyst was submitted for analysis with the following results:

Wt. percent $CeO_2$ _____ 8.64
Total volatiles (percent) _____ 2.95
Surface area (m.²/g.) _____ 179
Pore volume (cc./g.) _____ 0.43
Pore diameter (A.) _____ 96

Total volatiles were determined by heating a weighed sample at 1750° F. and reweighing. Surface area and pore volume were determined by the well known Brunauer-Emmett-Teller method. Average pore diameter is calculated from these results.

Conversion as a function of average catalyst temperature was determined by the method previously described. The results are shown below:

*Conversion as a function of average catalyst temperature*

Percent
Carbon monoxide at 940° F. _____ 90
Hydrocarbons at 770° F. _____ 30
Hydrocarbons at 950° F. _____ 60

EXAMPLE II

In this run, a cobalt promoted ceria-alumina catalyst was prepared.

A 250 gram quantity of the catalyst prepared in Example I (containing 8.64% $CeO_2$) was treated with 300 ml. of $NH_4OH$ (28% $NH_3$) and allowed to stand for 1 hour. Excess solution was then drained off.

The base was mixed with 250 ml. of a 4 molar $Co(NO_3)_2$ impregnating solution for 1 hour. The catalyst was separated from excess solution, dried for 4 hours at 110° C. and finally calcined for 16 hours at 1000° F.

The catalyst showed the following analytical results:

Wt. percent $CeO_2$ _____ 8.64
Wt. percent Co _____ 8.80
Total volatiles (percent) _____ 3.51
Surface area (M.²/g) _____ 143
Pore volume (cc./g.) _____ 0.33
Pore diameter (A.) _____ 92

*Percent conversion as a function of average catalyst temperature*

| | Percent |
|---|---|
| Carbon monoxide at 730° F. | 90 |
| Hydrocarbons at— | |
| 510° F. | 30 |
| 720° F. | 60 |
| 1020° F. | 90 |

The improved activity of the cobalt promoted catalyst is shown by the greater conversion of both hydrocarbons and carbon monoxide at lower temperatures.

What is claimed is:

A method of treating exhaust gases of internal combustion engines to oxidize the air pollutants therein which comprises mixing said gases with air, passing said mixture through a catalyst bed consisting essentially of 7 to 10% cerium oxide and up to 10% cobalt on a nodular gamma alumina support and passing the thus treated gases to the atmosphere.

References Cited

UNITED STATES PATENTS

| 2,945,057 | 7/1960 | McDaniel et al. | 252—462 X |
| 3,150,922 | 9/1964 | Ashley | 23—2 |
| 3,235,512 | 2/1966 | Koepernik | 23—2 X |

OSCAR R. VERTIZ, *Primary Examiner.*

EARL C. THOMAS, *Examiner.*